(12) United States Patent
Hecht et al.

(10) Patent No.: US 11,897,038 B2
(45) Date of Patent: Feb. 13, 2024

(54) CURVED FACE GROOVING BLADE AND FACE GROOVING HOLDER THEREFOR

(71) Applicant: Iscar, Ltd., Tefen (IL)

(72) Inventors: Gil Hecht, Nahariya (IL); David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 84 days.

(21) Appl. No.: 17/038,560

(22) Filed: Sep. 30, 2020

(65) Prior Publication Data

US 2022/0097247 A1 Mar. 31, 2022

(51) Int. Cl.
*B23B 27/08* (2006.01)
*B23B 29/04* (2006.01)
*B23B 29/06* (2006.01)

(52) U.S. Cl.
CPC .............. *B23B 29/06* (2013.01); *B23B 27/08* (2013.01); *B23B 29/043* (2013.01); *B23B 2205/02* (2013.01)

(58) Field of Classification Search
CPC ....... B23B 29/043; B23B 29/06; B23B 27/08; B23B 27/083; B23B 27/086; B23B 27/04; B23B 2220/126; B23B 2220/12; B23B 2210/022; B23B 2205/02; B23B 2205/125; B23B 29/04; B23B 29/046; B23B 29/14; B23B 27/045
See application file for complete search history.

(56) References Cited

U.S. PATENT DOCUMENTS

| | | | | |
|---|---|---|---|---|
| 622,625 A | * | 4/1899 | Hill | B23B 29/043 407/113 |
| 2,416,975 A | * | 3/1947 | Anthony | B23B 29/043 82/158 |
| 3,505,715 A | * | 4/1970 | Germani | B23B 27/045 407/101 |
| 3,599,303 A | * | 8/1971 | Sletten | B23B 27/045 29/25 |
| 3,688,366 A | * | 9/1972 | Jones | B23B 29/043 407/101 |
| 3,844,008 A | * | 10/1974 | Sletten | B23B 27/04 407/101 |

(Continued)

FOREIGN PATENT DOCUMENTS

CN 202571290 U * 12/2012
CN 112008100 A * 12/2020

(Continued)

OTHER PUBLICATIONS

International Search Report dated Jan. 18, 2022, issued in PCT counterpart application (No. PCT/IL2021/051139).

(Continued)

*Primary Examiner* — Ryan Rufo
(74) *Attorney, Agent, or Firm* — Womble Bond Dickinson (US) LLP

(57) ABSTRACT

A curved face grooving blade having a curved grooving portion and a clamping portion connected thereto. The grooving portion having an insert seat defining upward and downward directions. The clamping portion has a bottom wedge surface located in an inward and downward direction relative to the remainder of the clamping portion.

12 Claims, 7 Drawing Sheets

(56) References Cited

U.S. PATENT DOCUMENTS

| | | | | |
|---|---|---|---|---|
| 4,118,138 A | * | 10/1978 | Takacs | B23B 27/04 407/112 |
| 4,235,564 A | * | 11/1980 | Huser | B23B 27/04 407/101 |
| 4,332,513 A | * | 6/1982 | Gowanlock | B23B 27/04 407/120 |
| 4,555,202 A | * | 11/1985 | Pondes | B23B 29/043 407/111 |
| 5,150,992 A | * | 9/1992 | Friedmann | B23B 27/045 407/117 |
| 5,156,502 A | | 10/1992 | Satran | |
| 5,159,863 A | * | 11/1992 | Simpson, III | B23B 27/04 407/89 |
| 5,709,508 A | * | 1/1998 | Barazani | B23B 27/045 407/112 |
| 6,758,637 B2 | * | 7/2004 | Gati | B23B 27/08 407/92 |
| 7,419,337 B2 | * | 9/2008 | Berminge | B23B 27/04 407/107 |
| 7,758,286 B2 | * | 7/2010 | Nagaya | B23B 29/043 407/101 |
| 8,479,622 B2 | * | 7/2013 | Hecht | B23B 29/046 408/239 R |
| 8,911,185 B2 | * | 12/2014 | Nagaya | B23B 27/086 407/50 |
| 9,242,302 B2 | * | 1/2016 | Uno | B23B 29/046 |
| 9,475,122 B2 | * | 10/2016 | Andersson | B23B 27/045 |
| 10,052,693 B2 | * | 8/2018 | Kurokawa | B23B 27/08 |
| 10,071,428 B2 | * | 9/2018 | Kusuda | B23B 29/22 |
| 10,335,862 B2 | * | 7/2019 | Breisch | B23B 29/043 |
| 10,661,352 B2 | * | 5/2020 | Kaufmann | B23B 27/086 |
| 10,780,505 B2 | * | 9/2020 | Jansson | B23B 29/043 |
| 2006/0257216 A1 | | 11/2006 | Kimura et al. | |
| 2006/0257217 A1 | | 11/2006 | Berminge | |
| 2010/0178117 A1 | * | 7/2010 | Watanabe | B23B 27/007 407/11 |
| 2016/0193661 A1 | | 7/2016 | Kurokawa | |
| 2016/0339526 A1 | | 11/2016 | Luik et al. | |
| 2018/0085831 A1 | | 3/2018 | Sasaki | |

FOREIGN PATENT DOCUMENTS

| | | | | |
|---|---|---|---|---|
| DE | 2548072 A1 | * | 5/1977 | |
| DE | 3204693 | | 8/1983 | |
| DE | 3311741 A1 | | 10/1984 | |
| DE | 102011085548 A1 | * | 5/2013 | B23B 27/04 |
| EP | 1262262 A1 | * | 12/2002 | B23B 27/007 |
| FR | 1361649 A | * | 5/1964 | |
| FR | 2300645 | | 9/1976 | |
| GB | 1594759 A | * | 5/1978 | |
| WO | WO-2021260676 A1 | * | 12/2021 | B23B 27/10 |

OTHER PUBLICATIONS

Written Opinion dated Jan. 18, 2022, issued in PCT counterpart application (No. PCT/IL2021/051139).

* cited by examiner

CURVED FACE GROOVING BLADE AND FACE GROOVING HOLDER THEREFOR

FIELD OF THE INVENTION

The subject matter of the present invention relates to a face grooving blade and face grooving holder therefor (also referred to as "blade" and "holder" for conciseness) configured for metal machining applications. More particularly, said blade comprises with a curved grooving portion and a clamping portion connected to a convexly curved side of the grooving portion, the clamping portion being configured to be held by said holder.

BACKGROUND OF THE INVENTION

Examples of curved face grooving tools are disclosed in US2018085831, and US2016193661 and U.S. Pat. No. 5,156,502. US2018085831 and US2016193661 disclose a curved grooving blade removably retained in a holder, the blade having an insert seat. U.S. Pat. No. 5,156,502 discloses a holder having unitary one-piece construction with a curved forward grooving portion provided with an insert seat, and does not disclose a removable blade.

Examples of blades comprising clamping portions which are clamped are disclosed seen in US2006257217 (albeit which is not a curved face grooving blade but rather a planar blade designed for parting-off and not face grooving) and DE3204693.

SUMMARY OF THE INVENTION

In accordance with a first aspect of the invention, there is provided a face grooving blade comprising: a grooving portion and a clamping portion connected to the grooving portion; the grooving portion comprising: a first insert seat formed at an intersection of a front end surface and a top surface, and in turn comprising an upwardly facing first insert seat bottom surface; an upward direction generally defined as the direction which the first insert seat bottom surface faces and a downward direction generally defined opposite to the upward direction; at least a portion of the clamping portion is located the downward direction and the inward direction relative to the remainder of the grooving portion.

It will be understood that prior art clamping portions are previously known to extend parallel with the upward and downward directions. At least one advantage of the present invention is that when at least a part of the clamping portion is closer to being underneath the insert seat (relative to the mentioned prior art parallel arrangements). This allows the downward machining force on the cutting insert (and consequently the and consequently the upwardly facing first insert seat bottom surface) to drive the face grooving blade even stronger into the holder creating a more stable clamping arrangement than hitherto known.

A more detailed blade is described in accordance with a second aspect of the invention, there is provided a face grooving blade having a blade longitudinal axis establishing a forward-to-rearward direction, and comprising: a grooving portion and a clamping portion connected to the grooving portion; the grooving portion comprising: a concave inner surface; a convex outer surface located on an opposing side of the grooving portion to the concave inner surface; an outward direction generally defined from the concave inner surface towards the convex outer surface and an inward direction generally defined opposite to the outward direction; a bottom surface connecting the concave inner surface and the convex outer surface; a top surface located on an opposing side of the grooving portion to the bottom surface and connecting the concave inner surface and the convex outer surface; a front end surface connecting the concave inner surface and the convex outer surface and connecting the top surface and the bottom surface; a rear end surface located on an opposing side of the grooving portion to the front end surface and connecting the concave inner surface, the convex outer surface, the top surface and the bottom surface; and a first insert seat formed at an intersection of the front end surface and the top surface, and in turn comprising an upwardly facing first insert seat bottom surface and a second insert seat surface spaced apart therefrom; an upward direction generally defined as the direction in which the first insert seat bottom surface faces and a downward direction generally defined opposite to the upward direction; and the forward direction generally defined from the rear end surface to the front end surface, and the rearward direction generally defined opposite to the forward direction; and the clamping portion extends from the grooving portion in the outward direction, and is recessed in the rearward direction from the grooving portion's front end surface, the clamping portion comprising: a top wedge surface; a bottom wedge surface located on an opposing side of the clamping portion to the top wedge surface; a blade abutment surface located between the top wedge surface and the bottom wedge surface; and a rear stopper abutment surface located between the bottom wedge surface and the top wedge surface, and facing in the rearward direction; wherein: the bottom wedge surface is located in the downward direction and the inward direction relative to the top wedge surface.

A benefit over prior art blades is that the blade abutment surface can preferably have a planar shape allowing for better stability than curved prior art blades with little or no planar abutment surfaces at the side thereof.

As is known in the art the second insert seat surface can either being downwardly facing or forwardly facing as shown in the present drawings. Nonetheless it is understood that all known insert seats have an insert seat bottom surface which receives a majority of the machining force.

According to any of the aspects above, some preferred features are as follows.

Preferably, either the bottom wedge surface or the blade abutment surface is located directly in the downward direction from the first insert seat. More preferably, either the top wedge surface or the blade abutment surface is located directly in the outward direction from the first insert seat.

It will be understood that the downward machining force on the insert seat is more beneficial at stabilizing the blade when the supported abutment portions (particularly the blade abutment surface and even more so the bottom wedge surface) are directly under the first insert seat. The most preferred instance being when the bottom wedge surface is directly underneath the first insert seat, however since this is dependent on the desired curvature for a particular face grooving operation (each blade being designed for a specific curvature) the optimal positioning is not always possible. Nonetheless, in all cases this is preferred over the prior art arrangement where the clamping portion extends parallel (and not slanted) relative to the upward and downward directions.

Preferably, the blade abutment surface connects the top wedge surface to the bottom wedge surface.

It will be understood that a greater surface area of the blade abutment surface will provide more stability to the blade. Certainly far more stability than comparative prior art curved face grooving blades which only have relatively small abutment surfaces at the side thereof with the holder. While it is possible for only a portion of the surface extending between the top wedge surface and bottom wedge surface to be planar (and hence configured for reliable and stable abutment) in the most preferred instance the entire surface connecting the two wedges is planar.

Preferably, the concave inner surface is continuously curved.

In the drawings shown, the concave inner surface is not continuously curved, but rather there are two different sub-surfaces (separated by a ridge). It is preferred that there not be two different sub-surfaces but a single continuously curved surface. Such single surface allows a grooving operation to not be limited in cut depth. However, as will be understood from the disclosure below, it was found that only for a certain limited range of curvatures is such optimal design achievable.

Nonetheless, according to some preferred embodiments the concave inner surface comprises: a first concave inner sub-surface; a second concave inner sub-surface; and a ridge located at an intersection of the first concave inner sub-surface and the second concave inner sub-surface; the ridge comprising a projecting portion which projects farther in the inward direction than at least one of the first concave inner sub-surface and the second concave inner sub-surface.

It will be understood that this advantage is particularly beneficial for indexable blades, i.e. comprising a second insert seat at an opposing end of the grooving portion. An example of which is shown in the drawings. Although the insert seats shown are at diametrically opposed corners of the grooving portion, it may also be possible for them to be located at opposing sides of a common top surface or bottom surface.

While said projecting portion limits the cut depth of the blade, it allows an indexable blade with the benefit of a second insert seat, for curvatures that would not allow a single continuously cured concave inner surface.

Preferably, the projecting portion can extend perpendicular to the longitudinal direction of the blade. More particularly, the extension can be in the outward direction.

Preferably, the ridge can further comprise: a recessed portion which is more recessed in the outward direction than at least one of the first concave inner sub-surface and the second concave inner sub-surface. Preferably, the recessed portion can extend perpendicular to the longitudinal direction of the blade.

Preferably, the ridge further comprises an intermediary portion connecting the projecting portion and the recessed portion.

Preferably, the intermediary portion extends parallel with a longitudinal direction of the blade (in the drawings, this is parallel with the forward and rearward directions). Preferably, the intermediary portion can be located at the center of the concave inner surface. Preferably, the intermediary portion can be flush with the concave inner surface of the blade.

Preferably, the concave inner surface and the convex outer surface converge with increasing distance from the first insert seat. This is the preferred configuration for providing relief for face grooving.

Preferably, the face grooving portion further comprises a second insert seat. More preferably, the second insert seat is formed at an intersection of the bottom surface and the rear end surface. It will be understood that this reduces the complexity since the blade can simply be indexed by 180 degrees. If the two insert seats would both be along a common adjacent top or bottom edge to achieve the same operation the holder may be required to be clamped upside down in a turret or used in an opposite one of left-right machining directions, etcetera for one of the insert seats to be used. In such case the clamping portion further comprises a front stopper surface located between the bottom wedge surface and the top wedge surface, and facing in the forward direction.

Accordingly, preferably, the face grooving portion has 180 degree rotational symmetry about an axis of symmetry S perpendicular to the blade abutment seat.

Preferably, the face grooving blade further comprises a coolant arrangement. The coolant arrangement can comprise: a blade coolant inlet opening out to the blade abutment surface; and at least one coolant outlet directed towards the first insert seat. More preferably, the coolant arrangement further comprises a second coolant outlet directed towards the first insert seat. And most preferably, at least one coolant outlet opens out to the front end surface.

It will be noted that coolant arrangements for curved blades is more complex than for planar blades, due to the technology traditionally used for producing internal coolant channels, especially for channels extending underneath the insert seat in the relatively thin and curved part of the grooving portion (and hence opening out to the front end surface).

The above features generally define the directions, as is clear to a skilled person. However a more precise geometric definition of the directions relative to the insert seat bottom surface is as follows. A first point can be defined on the concave inner surface directly below the first insert seat, and more precisely below the insert seat bottom surface. A second point can be defined adjacent to the first point and on the convex outer surface directly below the first insert seat and more precisely below the insert seat bottom surface.

Thus, relative to these points, the outward direction can be precisely defined as parallel to an imaginary line L extending from the first point toward the second point. The inward direction can be more precisely defined as parallel to the imaginary line extending from the second point to the first point. The upward direction can be more precisely defined as perpendicular to the imaginary line and extending from the first point towards the insert seat bottom surface. The downward direction can be more precisely defined as perpendicular to the imaginary line and extending from the insert seat bottom surface towards the first point. The rearward direction can be more precisely defined as perpendicular to the imaginary line and both the upward and downward directions and extending from the first point towards the rear end surface. The forward direction can be more precisely defined as perpendicular to the imaginary line and both the upward and downward directions and extending from the rear end surface towards the first point.

After development, it was found to be preferable for stable mounting that the blade abutment surface is planar and defines a blade abutment plane P1 which forms an acute angle $\alpha$ with the downward direction, fulfilling the condition: $10° \leq \alpha \leq 42°$, more preferably $19° \leq \alpha \leq 33°$.

In accordance with a third aspect of the invention, there is provided a face grooving holder comprising: a shank portion; and a holder clamping portion; the holder clamping portion comprising: a clamping top side; a clamping bottom side located on an opposing side of the holder clamping portion to the clamping top side; a first clamping side connecting the clamping top side and the clamping bottom side; a second clamping side located on an opposing side of the holder clamping portion to the first clamping side; a clamping front end; a clamping rear end; a blade clamping seat formed along the second clamping side and opening out to the clamping front end; a clamping forward direction generally defined from the clamping rear end towards the clamping front end, and a clamping rearward direction generally defined opposite to the clamping forward direction; a clamping upward direction generally defined from the clamping bottom side towards the clamping top side, and a clamping downward direction generally defined opposite to the clamping upward direction; and a clamping first side direction generally defined from the second clamping side towards the first clamping side, and a clamping second side direction generally defined opposite the clamping first side direction; the blade clamping seat comprising: a flexibility groove opening out to the second clamping side and the clamping front end; a top clamping wedge surface located upward of the flexibility groove; a planar holder abutment surface located downward of the top clamping wedge surface; a bottom clamping wedge surface located downward of the flexibility groove and located on an opposing side of the planar holder abutment surface to the top clamping wedge surface; a forwardly facing back stopper surface, located between the top clamping wedge surface and the bottom clamping wedge surface and rearward of the planar holder abutment surface; wherein: the bottom clamping wedge surface is located in the clamping downward direction and the clamping second side direction relative to the top clamping wedge surface.

In accordance with a fourth aspect of the invention, there is provided a face grooving holder comprising a shank portion connected to a holder clamping portion; the holder clamping portion comprising: a clamping longitudinal axis establishing a clamping forward-to-rearward direction; a clamping vertical axis perpendicular to the clamping longitudinal axis and establishing a clamping upward-to-downward direction; a clamping lateral axis perpendicular to both the clamping longitudinal axis and the clamping vertical axis, and establishing a clamping-first-side-to-clamping-second-side direction; a clamping front end and a clamping rear end spaced apart from one another along the clamping longitudinal axis; a clamping top side and a clamping bottom side spaced apart from one another along the clamping vertical axis; a first clamping side and a second clamping side spaced apart from one another along the clamping lateral axis, the first clamping side connecting the clamping top side and the clamping bottom side; and a blade clamping seat formed along the second clamping side and opening out to the clamping front end; the blade clamping seat comprising: a flexibility groove opening out to both the second clamping side and the clamping front end; a top clamping wedge surface located upward of the flexibility groove; a holder abutment surface located downward of the top clamping wedge surface; a bottom clamping wedge surface located downward of the flexibility groove on an opposing side of the holder abutment surface from the top clamping wedge surface; and a forwardly facing back stopper surface, located between the top clamping wedge surface and the bottom clamping wedge surface along the clamping vertical axis, and rearward of the holder abutment surface along the clamping longitudinal axis; wherein in a front end view of the face grooving holder: the bottom clamping wedge surface is located downward of the top clamping wedge surface along the clamping vertical axis, and farther than the top clamping wedge surface in the second side direction along the clamping lateral axis.

The third and fourth aspects of the invention compliments the face grooving blade, with the same stable clamping facilitated.

Additionally, the back stopper surface allows a precise positioning of the face grooving blade and ease of mounting the blade. While such back stopper surface typically is considered disadvantageous for slidable blades with opposing wedges, since it no longer allows variable overhang adjustment of the blade, since the bottom clamping wedge surface is advantageously placed to allow the machining forces to stabilize the blade, the blade can be already pre-designed with a relatively long overhang, outweighing the disadvantage of such system not having a variable overhang option.

Preferably, a bore opens out to the clamping top side and extends downwardly, traversing the flexibility groove.

For similar beneficial reasons to the blade, preferably the holder abutment surface is planar and defines a holder abutment plane which forms an acute clamping angle $\beta$ with the clamping downward direction, fulfilling the condition: $10°≤\beta≤42°$, more preferably $19°≤\beta≤33°$.

To explain how the relatively larger abutment surface of a holder is provided, relative to prior art examples, preferably the holder abutment surface has a holder abutment surface area AA, and the blade clamping seat has a seat area AS, the holder abutment surface area AA and the seat area AS fulfilling the condition $0.5AS≤AA≤AS$, more preferably $0.7AS≤AA≤0.95\ AS$.

The seat area AS can be defined in the case of a rectangular shaped blade clamping seat with the condition: $AS=H2·L2$ (although the area calculation will be understood to differ for different shapes).

Similarly, the blade abutment surface can have a blade area AB.

The blade area AB can be defined in the case of a rectangular shaped blade clamping seat with the condition: $AB=L1·H1$ (although the area calculation will be understood to differ for different shapes).

Preferably, when the blade abutment surface abuts the holder abutment surface, the percentage of area that the blade abutment surface abuts of the seat area AS, is over 30% of the seat area AS (in which $AB≥0.30AS$), and more preferably over 55% of the seat area AS (in which $AB≥0.55AS$), and most preferably over 70% (in which $AB≥0.70AS$). Stated alternatively, a surface contact area PA between the blade abutment surface and seat area AS fulfills the condition $PA>0.30AS$, more preferably $PA>0.55AS$, and most preferably $PA>0.70AS$.

According to a fifth aspect of the present invention, there is provided a face grooving tool comprising: a face grooving holder according to the third aspect; and a face grooving blade according to the first or second aspect and mounted to the face grooving holder; wherein, in the mounted position: the top wedge surface abuts the top clamping wedge surface; the bottom wedge surface abuts the bottom clamping wedge surface; the blade abutment surface abuts the holder abutment surface; and the rear stopper abutment surface abuts and the back stopper surface.

Preferably, the abutment described above can be the only areas of abutment of the face grooving holder and face grooving blade.

According to a sixth aspect of the present invention, there is provided a face grooving tool comprising a face grooving blade according to any of the previous aspects mounted to a face grooving holder according to any of the previous aspects.

More precisely, the face grooving holder comprises a shank portion connected to a holder clamping portion, the holder clamping portion comprising: a clamping longitudinal axis establishing a clamping forward-to-rearward direction; a clamping vertical axis perpendicular to the clamping longitudinal axis and establishing a clamping upward-to-downward direction; a clamping lateral axis perpendicular to both the clamping longitudinal axis and the clamping vertical axis, and establishing a clamping-first-side-to-clamping-second-side direction; a clamping front end and a clamping rear end spaced apart from one another along the clamping longitudinal axis; a clamping top side and a clamping bottom side spaced apart from one another along the clamping vertical axis; a first clamping side and a second clamping side spaced apart from one another along the clamping lateral axis, the first clamping side connecting the clamping top side and the clamping bottom side; and a blade clamping seat formed along the second clamping side and opening out to the clamping front end, the blade clamping seat comprising: a flexibility groove opening out to both the second clamping side and the clamping front end; a top clamping wedge surface located upward of the flexibility groove; a holder abutment surface located downward of the top clamping wedge surface; a bottom clamping wedge surface located downward of the flexibility groove, on an opposing side of the holder abutment surface from the top clamping wedge surface; and a forwardly facing back stopper surface, located between the top clamping wedge surface and the bottom clamping wedge surface along the clamping vertical axis, and rearward of the holder abutment surface along the clamping longitudinal axis; wherein in a front end view of the face grooving holder: the bottom clamping wedge surface is located downward of the top clamping wedge surface along the clamping vertical axis, and farther than the top clamping wedge surface in the second side direction along the clamping lateral axis; wherein: the blade's top wedge surface abuts the holder's top clamping wedge surface; the blade's bottom wedge surface abuts the holder's bottom clamping wedge surface; the blade's blade abutment surface abuts the holder's holder abutment surface; and the blade's rear stopper abutment surface abuts and the holder's back stopper surface.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1:
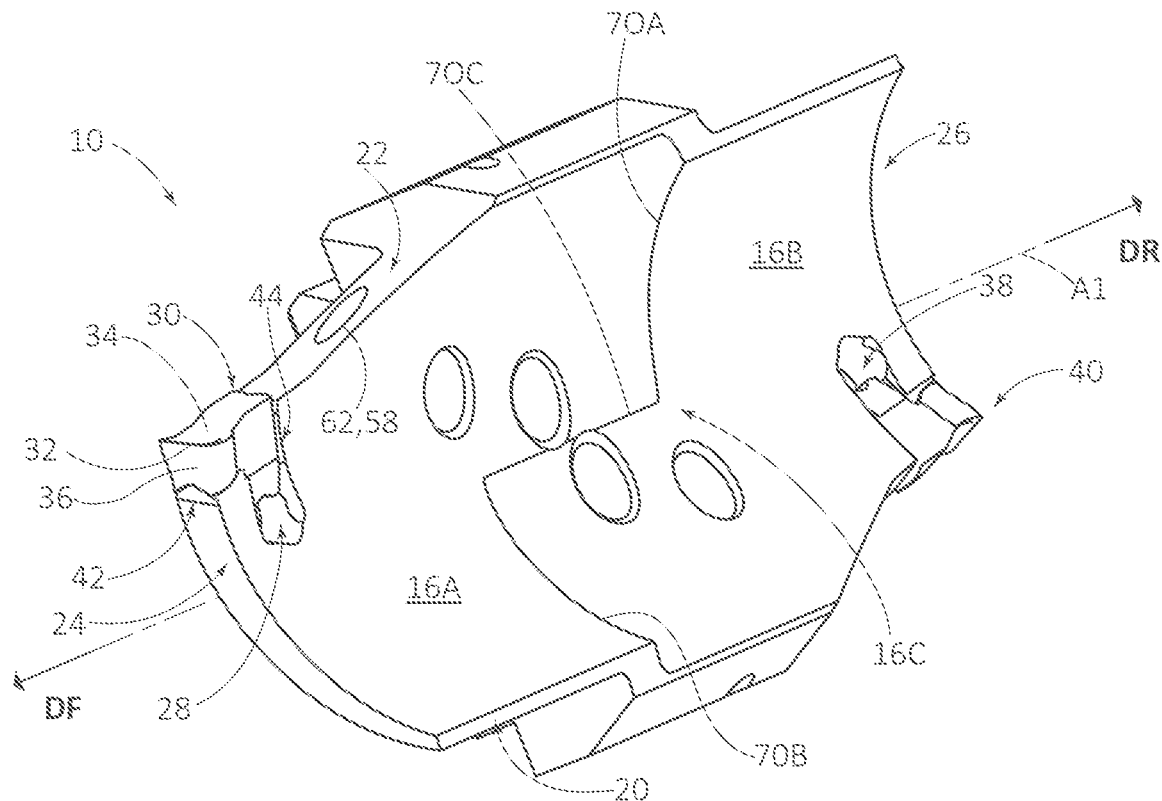
FIG. 1 is a perspective view of a face grooving blade according to the present invention.

Drawing attention first to FIGS. 1 to 5, a first example of a curved face grooving blade 10 is shown.

The blade 10 has a blade longitudinal axis A1 establishing a blade forward-to-rearward direction DF, DR and comprises a grooving portion 12 connected to a clamping portion 14.

The grooving portion 12 comprises a concave inner surface 16, a convex outer surface 18, a bottom surface 20, a top surface 22, a front end surface 24 and a rear end surface 26. The clamping portion 14 is recessed from the front end surface 24 and thus only partially overlaps the grooving portion 12 along the blade longitudinal axis A1.

Figure 4:
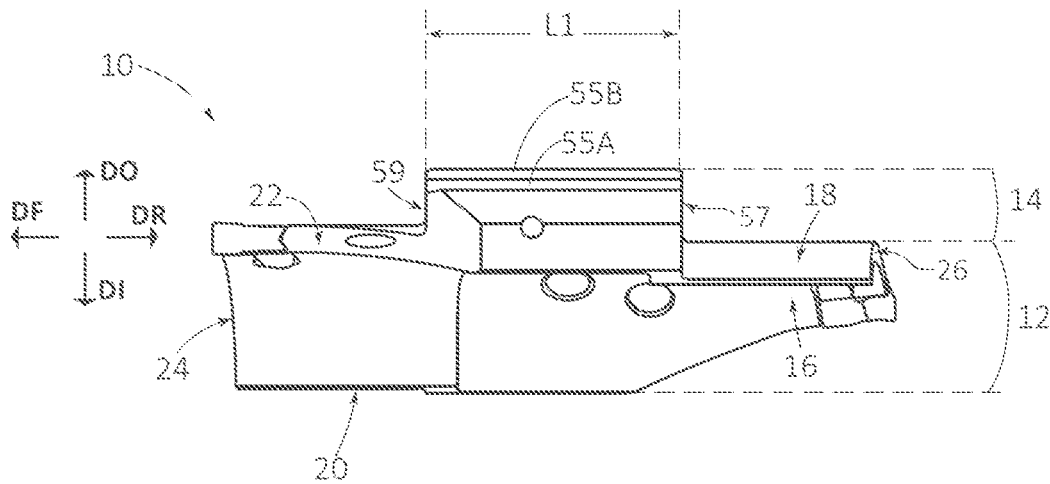
FIG. 4 is a top view of the face grooving blade of FIG. 1.
Figure 5:
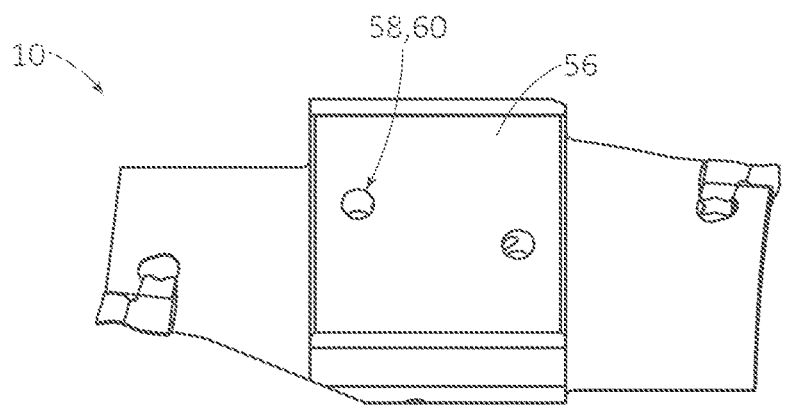
FIG. 5 is a second side view (also called an outer view), in an opposite direction to the first side view, of the face grooving blade of FIG. 1.

As best shown in FIG. 4, the face grooving blade 10, and more precisely the grooving portion 12 thereof, is elongated in the same basic direction as the extension of the bottom and top surfaces 20, 22 (or stated differently in a longitudinal direction along the blade longitudinal axis A1 and parallel to blade forward and rearward directions DF, DR).

For relative reference of elements, directions are provided, namely an outward direction DO, an inward direction DI, an upward direction DU, a downward direction DD, the aforementioned forward direction DF and the aforementioned rearward direction DR.

Figure 2:
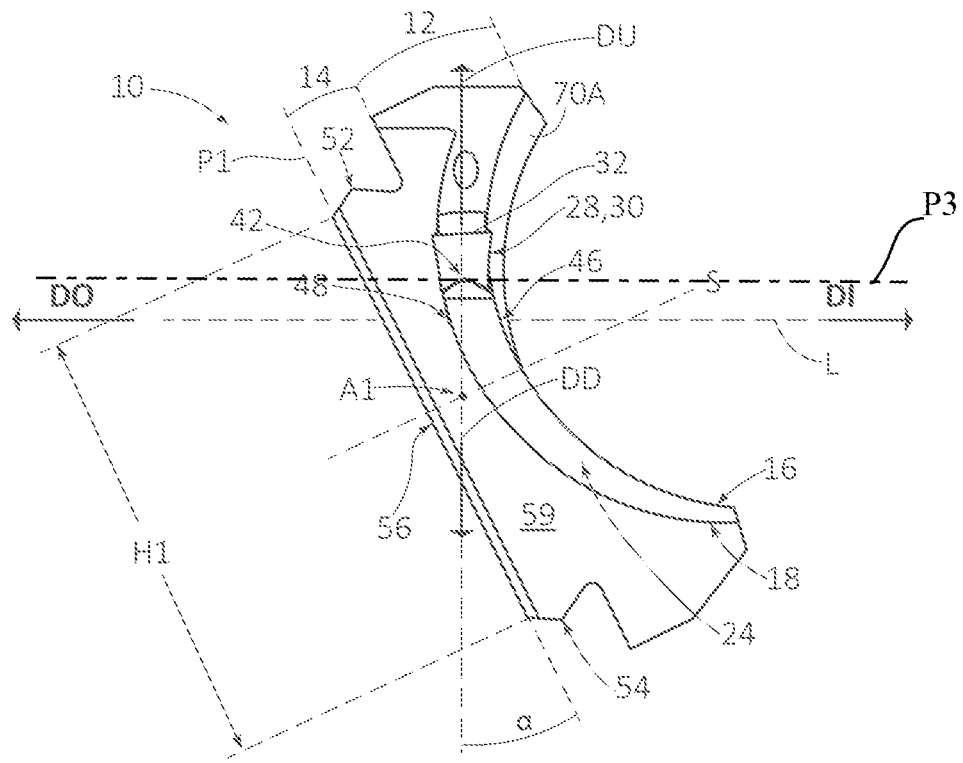
FIG. 2 is a front end view of the face grooving blade of FIG. 1.

As shown in FIG. 2, the concave inner surface 16 and the convex outer surface 18 converge, at least in part, in the downward direction DD. As the grooving portion 12 is curved, it will be understood that said convergence is not in a precise downward direction DD but rather in a general downward direction DD basically meaning downward relative to the nearby first insert seat 28 (the view of which is obscured in FIG. 2 by a first cutting insert 30 mounted to the first insert seat 28).

Stated differently, the front end surface 24 tapers with increasing distance from the insert seat 28. This provides relief during a face grooving operation.

Briefly drawing attention to FIG. 1, the first cutting insert 30 comprises a cutting edge 32, located between a rake surface 34 (above which machined chips are intended to flow) and a relief surface 36.

The first insert seat 28 is formed at an intersection of the front end surface 24 and the top surface 22.

Figure 3:
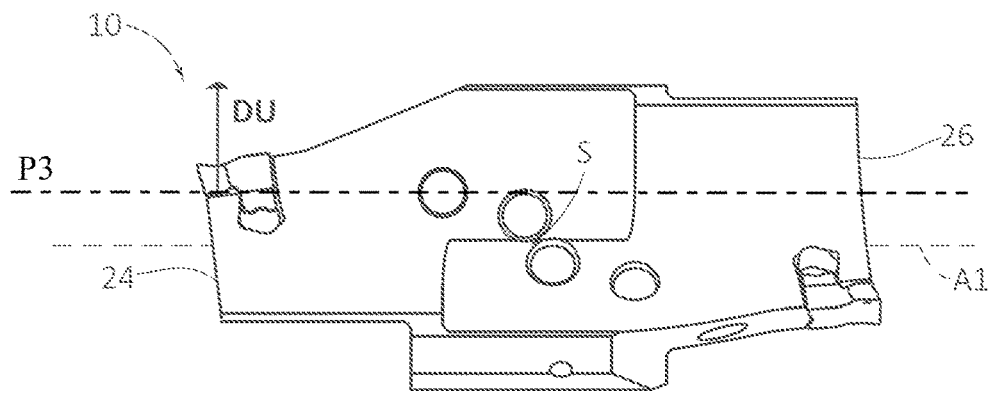
FIG. 3 is a first side view (also called an inner view) of the face grooving blade of FIG. 1.

In embodiments where the grooving portion 14 is double-ended, the face grooving blade 10 may be 180 degrees rotationally symmetric about a symmetry axis S passing through the center of at least the grooving portion 12. Therefore discussion will not be made of the symmetrical features such as the additional and identical, second insert seat 38 and second cutting insert 40 mounted thereto. As seen in FIG. 2, the upward and downward directions DU, DD are based on the general direction faced by the first insert seat 28. Also, the side view of FIG. 3 is a view along the DI-DO directions (which is perpendicular to the DU-DD direction) which is not parallel to symmetry axis S. As such, the symmetry axis S seen in FIG. 3 is not perpendicular to the page.

The first insert seat 28, comprises an upwardly facing first insert seat bottom surface 42 (located opposite the rake surface 34) and a forwardly facing second insert seat surface 44.

As shown in FIG. 2 the first insert seat bottom surface 42 has a wedge (or tapered) shape, for other insert seat types this may not be the case. For all intents and purposes in the present disclosure, the first insert seat surface can be considered a flat or planar surface facing the upward direction DU. In the front end view of FIG. 2, the insert seat bottom surface 42 intersects the blade's concave inner surface 16 at a concave intersection point 16p, and intersects the blade's convex outer surface 18 at a convex intersection point 18p. As also seen in this view, the upward and downward directions DU, DD are defined as being normal an imaginary insert seat plane P3 which contains the concave and convex intersection points 16p, 18p and is parallel to the blade longitudinal axis A1. Also, the upward and downward directions DU, DD are parallel to an imaginary vertical plane P4 which is perpendicular to the imaginary insert seat plane P3, and contains the blade longitudinal axis A1.

As also seen in FIG. 2, in a front view of the blade 10 having the first cutting insert 30 seated in the first insert seat 28, the upward direction DU may also be defined as being perpendicular to the cutting edge 32 of said first cutting insert 30.

An alternative, more precise definition of the directions can be made using a first point 46 on the concave inner surface 16 and located directly below, and adjacent to, the first insert seat bottom surface 42. The word "adjacent" in this context meaning before the grooving portion 12 notably curves. Additionally, a second point 48 is directly adjacent to the first point 46 and on the convex outer surface 18 and directly below, and adjacent to, the first insert seat bottom surface 42.

A straight imaginary line L extending from the first point 46 toward the second point 48, further defines the precise directions as detailed above.

The clamping portion 14 comprises a top mounting surface 52, a bottom mounting surface 54, a blade abutment surface 56 defining a blade abutment plane P1, a rear stopper abutment surface 57 (FIG. 4) and, in this indexable blade example, a front stopper abutment surface 59. The blade abutment surface 56 may be planar and thus may be considered a planar blade abutment surface 56. As seen in FIG. 2, the symmetry axis S is perpendicular to the abutment plane P1 of the blade abutment surface 56 while the blade longitudinal axis A1 is parallel to the blade abutment plane P1. The symmetry axis S may intersect the blade longitudinal axis A1. The top and bottom mounting surfaces 52, 54 are wedge-shaped and therefore may be considered top and bottom wedge surfaces 52, 54. The top and bottom wedge surfaces 52, 54 are convex, and more specifically each having a v-shape with slanted surfaces 55A, 55B (FIG. 4) extending equally from a central apex, but could alternatively be can be concave (with a corresponding change to the holder design). However, the top and bottom wedge surfaces 52, 54 shown are the most preferred design for ease of manufacture.

As shown, the blade abutment surface 56 connects (i.e. extends all the way to) the top wedge surface 52 and the bottom wedge surface 54 which provides greater area for abutment and hence greater stability than in embodiments, which are still feasible, which have a smaller area.

More specifically, the blade abutment surface 56 has a blade area AB, which in this example of a rectangular surface is calculated from the length L1 (FIG. 4) and the height H1 (FIG. 2).

Drawing attention particularly to FIG. 2, the clamping portion 14, or more specifically, the blade abutment surface 56, extends in the downward and inward directions DD, DI from the top wedge surface 52 to the bottom wedge surface 54.

Stated differently, the bottom wedge surface 54 is preferably located directly in the downward direction DD from the first insert seat 28 or, as shown, is located downwardly and inwardly relative to the first insert seat 28.

The blade abutment surface 56 is non-parallel to the upward and downward directions DU, DD. The blade abutment surface 56 can be planar and define a plane P1 which forms an acute angle α with the downward direction DD.

The blade 10 comprises an internal coolant arrangement 58.

The coolant arrangement 58 comprises a blade coolant inlet 60 (FIG. 5) and at least one internal passage (not shown) to at least one blade coolant outlet (in this example the at least one blade coolant outlet being constituted by a single upper coolant outlet 62 (FIG. 1).

Figure 13:
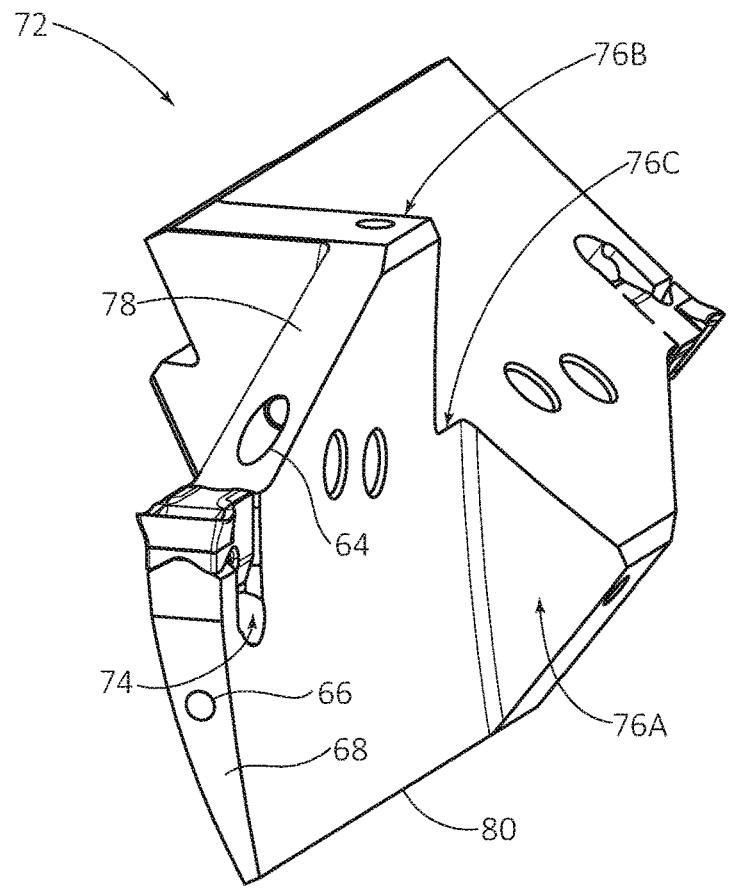
FIG. 13 is a perspective view of another face grooving blade according to the present invention.

In the similar embodiment to be discussed in FIG. 13, it is shown that there can be both an upper coolant outlet 64, and a second coolant outlet 66 opening out to a front end surface 68.

Reverting to FIG. 1, it will be understood that all coolant outlets preferably, although optionally, are basically directed towards the insert seat 28, and more precisely a cutting zone approximately located where an insert's cutting edge 32 and a workpiece (not shown) are intended to engage.

It will be understood that it is still feasible for the blade 10 to have a single insert seat, or even a plurality of insert seats, and yet not be rotationally symmetric.

While it is desirable for the concave inner surface 16 to be continuously curved (i.e. free of projections or steps; not shown) since projections can limit the depth the blade can machine, it has been found that with certain ranges of curvatures and an insert seat at each end of the blade 10 (i.e., a double-ended curved blade) a non-continuous concave inner surface 16 is necessitated.

To elaborate, referring specifically to FIGS. 1 and 2, in the present example the concave inner surface 16 comprises first and second concave inner sub-surfaces 16A, 16B and a ridge 16C located at the intersection thereof.

Relative to the first insert seat 28, the ridge 16C comprises a projecting portion 70A projecting in the inward direction DI, a recessed portion 70B recessed in the outward direction DO, and an intermediary portion 70C connecting the projecting portion 70A and the recessed portion 70B. It is understood that from the perspective of the second insert seat 38, the projecting and recessed portions are switched.

In the front end view of FIG. 2, only the projecting portion 70A is visible. Thus it can be understood that it limits the depth of machining of the blade 10 when moving relatively in the forward direction DF into a workpiece (not shown).

It will be understood that relative to the additional insert seat designated 38, the so-called recessed portion 70B is actually the projecting portion, and the so-called projecting portion 70A is actually the recessed portion.

Thus in each operative position, the projecting portion is adjacent to the longitudinal edge associated with the insert seat. To explain, in the example shown the projecting portion 70A is adjacent to the same longitudinal surface (i.e. the top surface 22) which the first insert seat 28 is proximate too (as opposed to the bottom surface 20 which it is distal too).

Notably, this is the arrangement for the blade 10 which is configured for face grooving of a relatively curved path (i.e. a grooving portion with a relatively small radius).

By contrast, referring to FIGS. 13 to 17, another blade designated 72 is configured for face grooving of a relatively straight path (although still curved somewhat; i.e. a grooving portion with a relatively large radius).

Notably, relative to a first insert seat 74 the location of the projecting portion 76A is not adjacent to the same longitudinal surface 78 as the first insert seat 74 but rather is adjacent to the distal longitudinal surface 80. The same reversal being true for the recessed portion 76B (noting that the position of the intermediary portion 76C is unchanged, albeit relatively shortened in the longitudinal direction).

Figure 14:
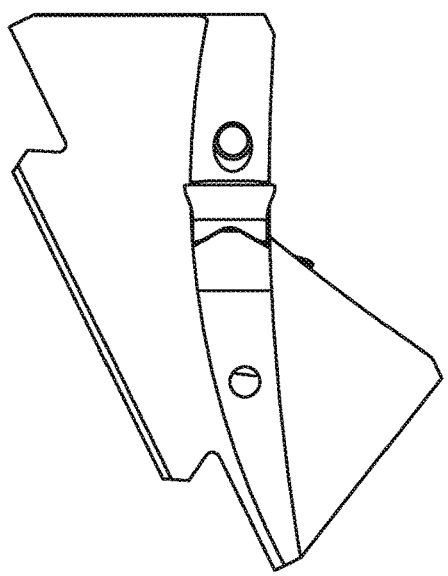
FIG. 14 is a front end view of the face grooving blade of FIG. 13.
Figure 15:
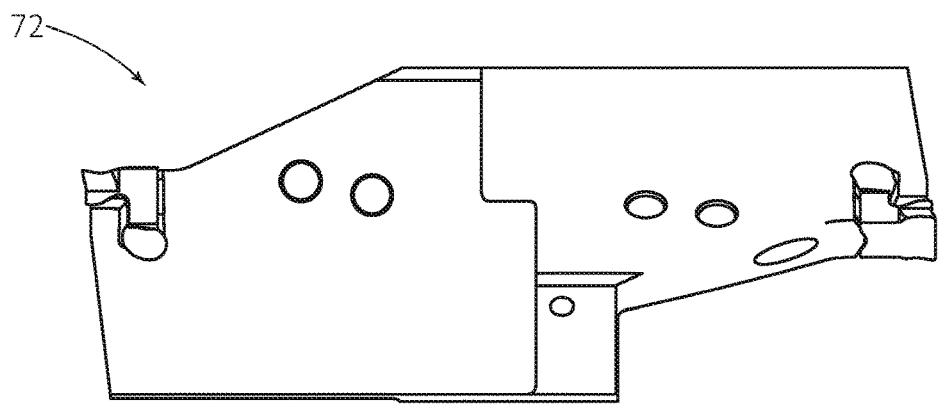
FIG. 15 is a first side view of the face grooving blade of FIG. 13.
Figure 16:
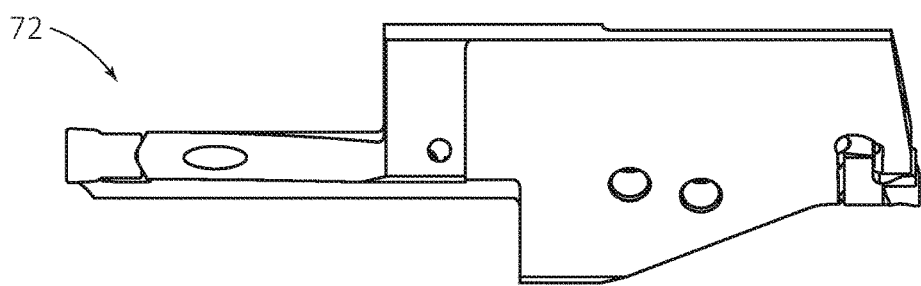
FIG. 16 is a top view of the face grooving blade of FIG. 13.
Figure 17:
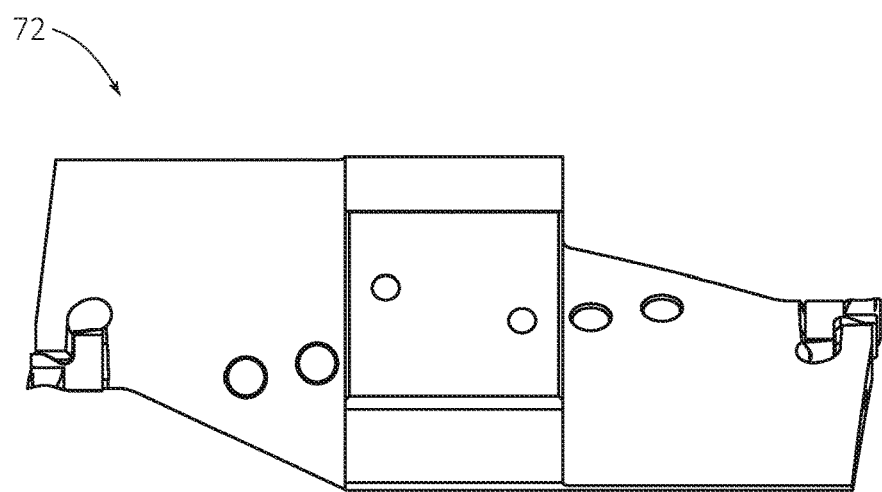
FIG. 17 is a second side view of the face grooving blade of FIG. 13, in an opposite direction to the first side view.

As will be understood best from the front end views of FIGS. 2 and 14, this reversal of positions is to maintain the desired mirror-image or curvature of the grooving portion 12 relative to the clamping portion 14.

While not shown, it will be understood that there will also be an intermediary region in which the concave inner surface 16 is continuously curved. The intermediary region is advantageous in that the depth of cut is not limited by any projection from the concave inner surface.

Figure 6:
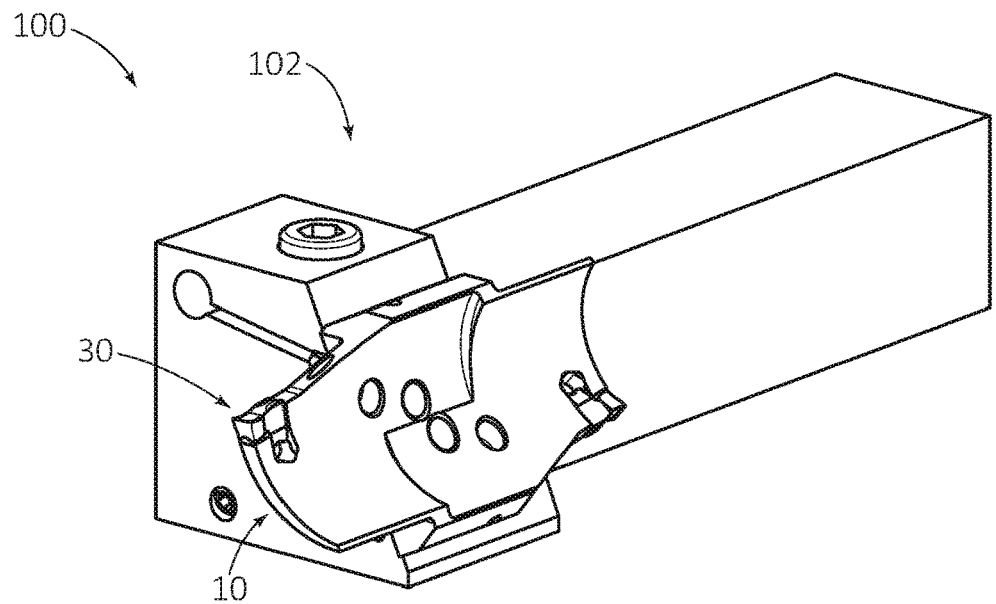
FIG. 6 is a perspective view of a face grooving tool comprising the face grooving blade of FIG. 1, according to the present invention.
Figure 7:
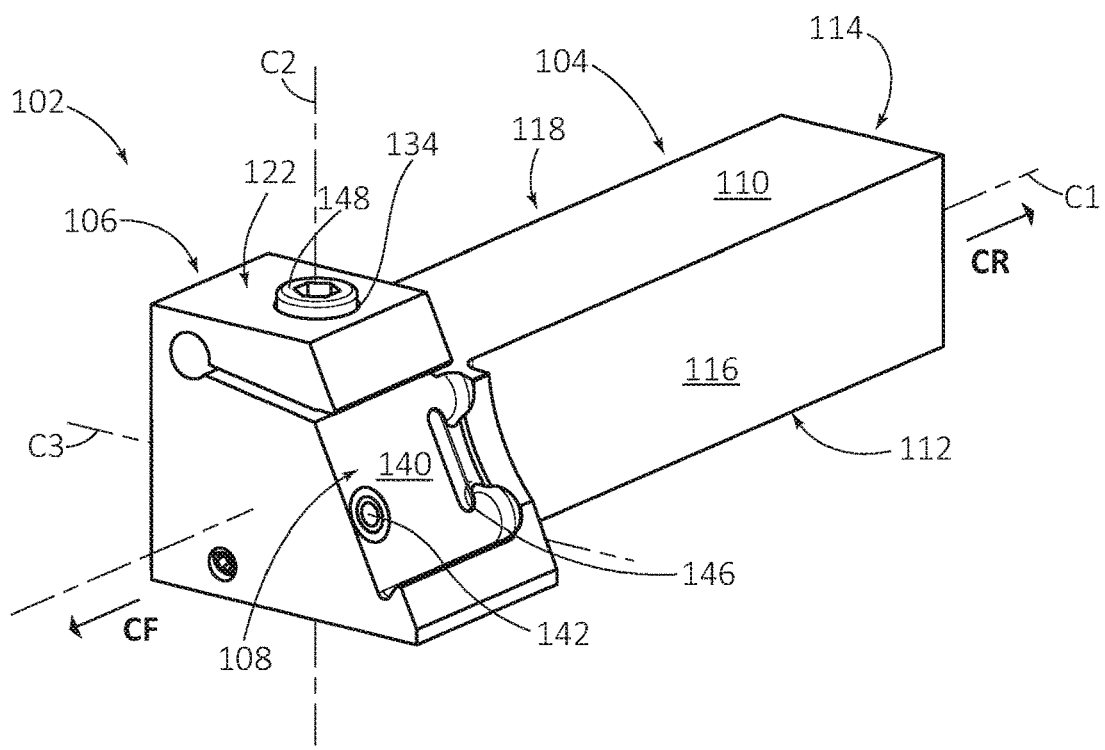
FIG. 7 is a perspective view of the face grooving holder in FIG. 6.

Now referring to FIG. 6 a face grooving tool 100 is shown as comprising an exemplary face grooving holder 102 configured to hold either of the above described blades, with the blade 10 (and cutting insert 30 mounted thereto) being exemplified.

Referring also to FIGS. 7 to 10, the face grooving holder 102 comprises a shank portion 104 and a holder clamping portion 106.

It will be understood that many holder types are possible, and that the essential feature here is not the shank type or position but rather a blade clamping seat 108 configured to hold a blade according to the present invention.

In this particular preferred example, the shank portion 104 is elongated with a square cross section and extends in a clamping rearward direction CR relative to the holder clamping portion 106. Alternatively, a shank portion (not shown) could be located on the opposing side of a holder clamping portion relative to a blade clamping seat. Another feasible alternative (not shown) is that a shank portion has a round cross section, etc.

The shank portion 104 comprises: an elongated shank top surface 110 and an elongated shank bottom surface 112 located on an opposing side of the shank portion 104; a shank back surface 114 located on an opposing side of the shank portion 104 to the holder clamping portion 106; and opposing first side and second side surfaces 116, 118.

Figure 8:
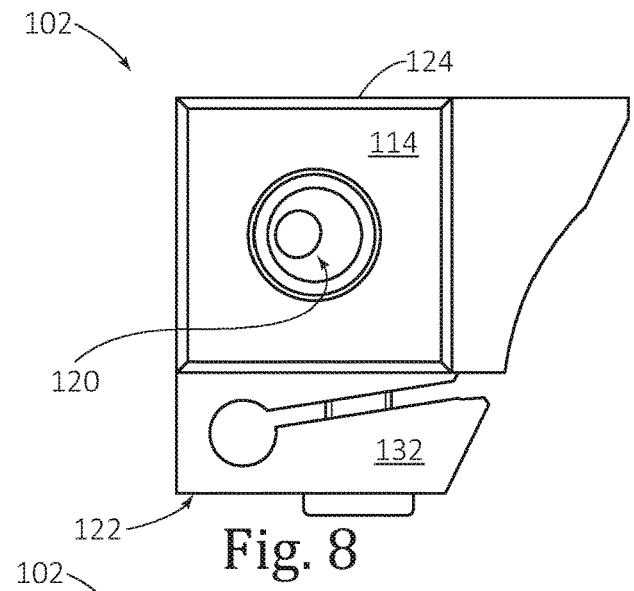
FIG. 8 is a rear end view of the face grooving holder of FIG. 7.
Figure 9:
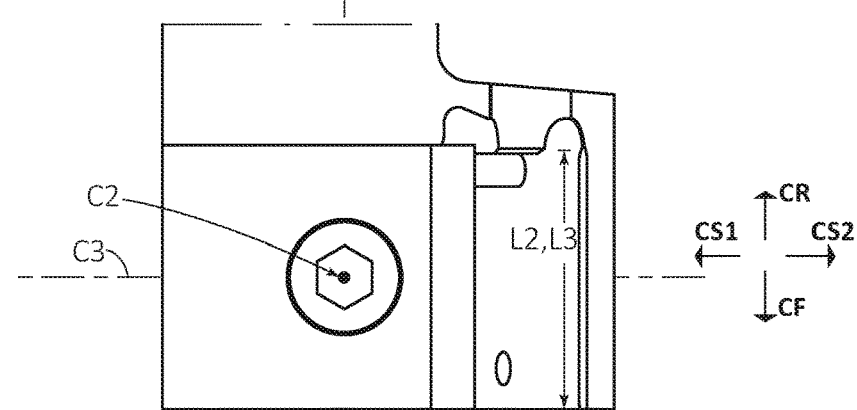
FIG. 9 is a top view of a front portion of the face grooving holder of FIG. 7.

The shank back surface 114 is formed with a holder coolant inlet 120 (FIG. 8; which could also be in different or additional locations on the shank portion 104, or even on the holder clamping portion 106).

The holder clamping portion 106 has a clamping longitudinal axis C1 establishing a clamping forward-to-rearward direction CF, CR, a clamping vertical axis C2 establishing a clamping upward-to-downward direction CU, CD, and a clamping lateral axis C3 establishing a clamping first-side-to-second-side direction CS1, CS2. The various clamping axes C1, C2, C3 are mutually perpendicular to one another.

The holder clamping portion 106 is connected to, and extends in a clamping forward direction CF relative to, the shank portion 104.

The holder clamping portion 106 comprises a clamping top side 122, a clamping bottom side 124, a first clamping side 126, a second clamping side 128, a clamping front end 130, a clamping rear end 132, and the aforementioned blade clamping seat 108.

The clamping forward direction CF is opposite to the clamping rearward direction CR.

There is further a clamping upward direction CU from the clamping bottom side 124 towards the clamping top side 122, and a clamping downward direction CD generally defined opposite thereto.

A clamping first side direction CS1 is generally defined from the second clamping side 128 towards the first clamping side 126, and a clamping second side direction CS2 is generally defined opposite thereto.

The above directions could also be more precisely referenced from the shank portion 104, which at least in this type of holder has precisely positioned surfaces (as opposed to curved shank types).

The holder clamping portion 106 further comprises a screw bore 134 opening out to the clamping top side 122 and extending towards the clamping bottom side 124.

The blade clamping seat 108 is formed with a flexibility (resilient) groove 136, a top clamping wedge surface 138, a holder abutment surface 140 defining a holder abutment plane P3, a seat coolant outlet 142 (positioned to provide coolant to the blade coolant inlet 60), a bottom clamping wedge surface 144 and a forwardly facing back stopper surface 146. As seen in the front view of FIG. 10, the flexibility groove 136 opens out to both the second clamping side 128 and the clamping front end 130, but does not open out to the first clamping side 126. As also seen in the front view of FIG. 10, the top clamping wedge surface 138 and the bottom clamping wedge surface 144 converge in a direction away from the holder abutment surface 140, with each surface 138, 144 forming an acute angle with the holder abutment surface 140. The holder abutment surface 140 may be planar and may thus be considered a planar holder abutment surface 140.

It will be understood that rather than the integral arrangement shown, a feasible alternative option, not shown, is for a top clamp portion to be completely detached from a lower base portion, however the integral option shown is preferred.

Figure 10:
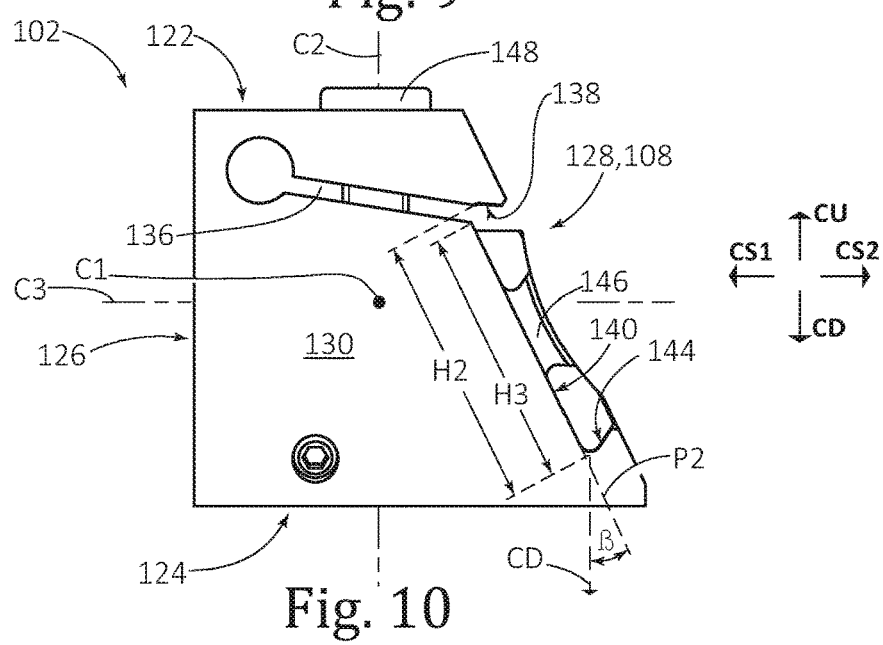
FIG. 10 is a front end view of the face grooving holder of FIG. 6.

The blade clamping seat 108 has a length L2 (FIG. 9) and a height 112 (FIG. 10). The blade clamping seat 108 thus has a seat area AS=L2×H2.

The holder abutment surface 140 has length L3 (FIG. 9) and a height 113 (FIG. 1). The holder abutment surface 140 thus has a holder abutment surface area AA=L3×H3.

Notably, length L2 and length L3 are equal, whereas height 112 is slightly larger than height 113. Therefore the seat area AS is slightly larger than the holder abutment surface area AA.

The top clamping wedge surface 138 and bottom clamping wedge surface 144 rather than having two slanted surfaces each have only a single slanted surface, which is configured to mate with the blade's 10 corresponding wedge surfaces. As seen from FIGS. 7-10, the top clamping wedge surface 138 extends along the clamping longitudinal axis C1 longer than it extends along both the clamping vertical axis C2 and the clamping lateral axis C3. Similarly, the bottom clamping wedge surface 144 extends along the clamping longitudinal axis C1 farther than it extends along both the clamping vertical axis C2 and the clamping lateral axis C3.

The holder abutment plane P2 forms an acute clamping angle β with the clamping downward direction CD.

A single screw 148 is shown mounted in the single screw bore 134 in the holder clamping portion 106. It will be understood that in some embodiments there may be more than one screw bore and screw. Another alternative to the screw bore is a resilient holder clamping surface (not shown) which is normally closed.

Figure 11:
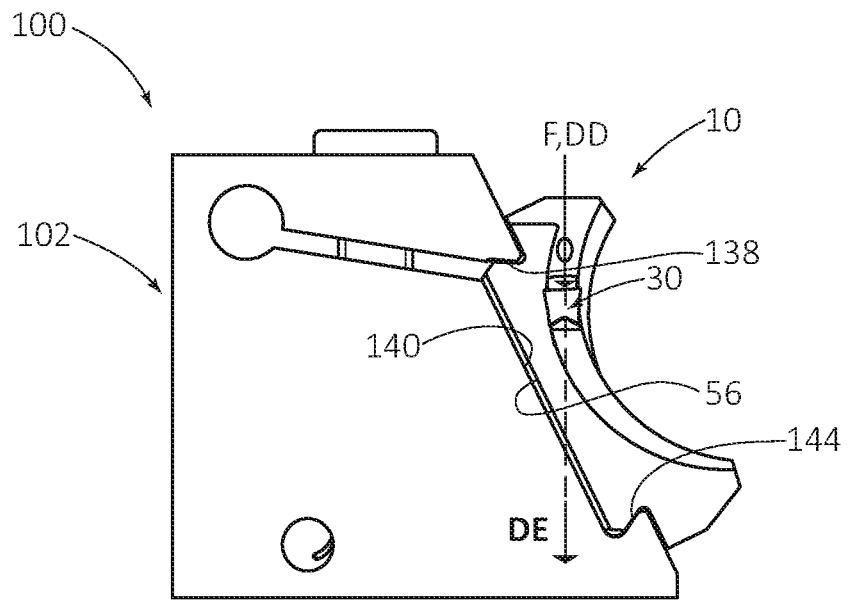
FIG. 11 is a front end view of the face grooving tool of FIG. 6.
Figure 12:
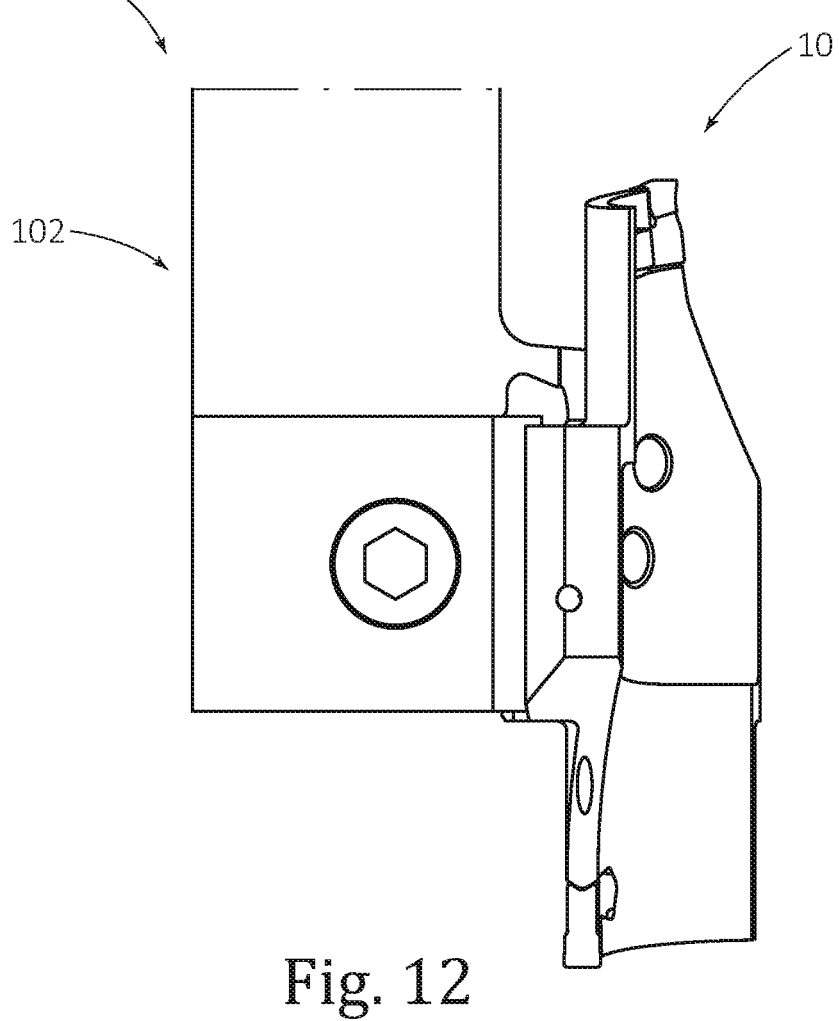
FIG. 12 is a top view of the face grooving tool of FIG. 6, with only a portion of the face grooving holder shown.

Referring also to FIGS. 11 and 12, the assembled face grooving tool 100 will be discussed.

To mount the blade 10 to the face grooving holder 102, the clamping portion 14 of the face grooving blade 10 is first slid rearwardly into the blade clamping seat 108.

To elaborate, during sliding, the blade's bottom wedge surface 54 abuts the holder's bottom clamping wedge surface 144 and the blade's blade abutment surface 56 abuts the holder's holder abutment surface 140. Said sliding is stopped by abutment of the blade's rear stopper abutment surface 57 with the holder's back stopper surface 146.

Subsequently, the screw 148 is fastened to bring the top clamping wedge surface 138 into engagement with the blade's top wedge surface 52, thereby clamping the blade 10.

The face grooving blade 10 is then held in a rigid and repeatable manner in the face grooving holder 102, with cutting forces which arise during machining being distributed between the four above-mentioned abutment regions.

Drawing attention to FIG. 11, a machining force F is schematically shown in the downward direction DD on the cutting insert 30.

As seen in FIG. 11, a downward extension DE of the machining force F intersects the abutment interface between the blade's blade abutment surface 56 and the holder's holder abutment surface 140. Thus, the top clamping wedge surface 138 and the bottom clamping wedge surface 144 are on opposite sides of the downward extension DE of the machining force F. Furthermore, the clamping portion 14, or more particularly the abutment region constituted by the abutment of the bottom wedge surface 54 with the bottom clamping wedge surface 144 extends below the cutting insert 30 and to an opposite (far) side of the downward extension DE of the machining force F, relative to the top clamping wedge surface 138. Consequently, the machining force F assists clamping by biasing the blade's bottom wedge surface 54 against the holder's bottom clamping wedge surface 144 thereby providing stronger clamping of the blade 10 than would be the case of a clamping portion (not shown) located only to the side of the blade 10.

Moreover, in the prior art tools, the side location of the clamping portion actually provides an undesired tilting or rotating effect which is mitigated or even eliminated by the present invention.

The invention claimed is:

1. A face grooving holder (102) comprising:
  a shank portion (104) connected to a blade holder clamping portion (106);
  the blade holder clamping portion (106) comprising:
    a clamping longitudinal axis (C1) establishing a clamping forward-to-rearward direction (CF, CR);
    a clamping vertical axis (C2) perpendicular to the clamping longitudinal axis (C1) and establishing a clamping upward-to-downward direction (CU, CD);
    a clamping lateral axis (C3) perpendicular to both the clamping longitudinal axis (C1) and the clamping vertical axis (C2), and establishing a clamping-first-side-to-clamping-second-side direction (CS1, CS2);
    a clamping front end (130) and a clamping rear end (132) spaced apart from one another along the clamping longitudinal axis (C1);
    a clamping top side (122) and a clamping bottom side (124) spaced apart from one another along the clamping vertical axis (C2);
    a first clamping side (126) and a second clamping side (128) spaced apart from one another along the clamping lateral axis (C3), the first clamping side (126) connecting the clamping top side (122) and the clamping bottom side (124); and
    a blade clamping seat (108) formed along the second clamping side (128) and opening out to the clamping front end (130);
  the blade clamping seat (108) comprising:
    a flexibility groove (136) opening out to both the second clamping side (128) and the clamping front end (130);
    a top clamping wedge surface (138) located upward of the flexibility groove (136);
    a bottom clamping wedge surface (144) located downward of the flexibility groove (136);
    a planar holder abutment surface (140) extending from the bottom clamping wedge surface (144) to the flexibility groove (136); and
    a forwardly facing back stopper surface (146), located between the top clamping wedge surface (138) and the bottom clamping wedge surface (144) along the clamping vertical axis (C2), and rearward of the holder abutment surface (140) along the clamping longitudinal axis (C1);
  wherein the top clamping wedge surface (138) extends in a direction along the clamping longitudinal axis (C1) farther than in directions along both the clamping vertical axis (C2) and the clamping lateral axis (C3);
  wherein the bottom clamping wedge surface (144) extends in said direction along the clamping longitudinal axis (C1) farther than in directions along both the clamping vertical axis (C2) and the clamping lateral axis (C3); and
  wherein in a front end view of the face grooving holder (102):
    the bottom clamping wedge surface (144) is located downward of the top clamping wedge surface (138) along the clamping vertical axis (C2), and farther than the top clamping wedge surface (138) in the second side direction (CS2) along the clamping lateral axis (C3); and
    the top clamping wedge surface (138) and the bottom clamping wedge surface (144) converge in a direction away from the holder abutment surface (140).

2. The face grooving holder (102) according to claim 1, wherein the holder abutment surface (140) defines a holder abutment plane (P2) which forms an acute clamping angle β with the clamping downward direction (CD), fulfilling the condition: $10° \leq β \leq 42°$.

3. The face grooving holder (102) according to claim 2, wherein the acute clamping angle β fulfills the condition: $19° \leq β \leq 33°$.

4. The face grooving holder (102) according to claim 1, wherein the holder abutment surface (140) has a holder abutment surface area AA, and the blade clamping seat (108) has a seat area AS, the holder abutment surface area AA and the seat area AS fulfilling the condition $0.5 AS \leq AA \leq AS$.

5. The face grooving holder (102) according to claim 4, fulfilling the condition $0.7 AS \leq AA \leq 0.95 AS$.

6. The face grooving holder (102) according to claim 1, wherein, in the blade clamping seat (108), the flexibility groove (136) does not open out to the first clamping side (126).

7. The face grooving holder (102) according to claim 1, wherein, in the blade clamping seat (108):
the top clamping wedge surface (138), the holder abutment surface (140), the bottom clamping wedge surface (144) and the forwardly facing back stopper surface (146) are integrally arranged to have one-piece monolithic construction.

8. A face grooving tool (100) comprising a face grooving blade (10) mounted in a face grooving tool holder (102);
the face grooving blade (10) having a blade longitudinal axis (A1) establishing a forward-to-rearward direction (DF, DR), and comprising:
a face grooving portion (12) and a clamping portion (14) connected to the face grooving portion;
the face grooving portion (12) comprising:
 a concave inner surface (16);
 a convex outer surface (18) located on an opposing side of the face grooving portion (12) to the concave inner surface (16);
 a bottom surface (20) connecting the concave inner surface (16) and the convex outer surface (18);
 a top surface (22) located on an opposing side of the face grooving portion (12) to the bottom surface (20) and connecting the concave inner surface (16) and the convex outer surface (18);
 a front end surface (24) connecting the concave inner surface (16) and the convex outer surface (18) and connecting the top surface (22) and the bottom surface (20);
 a rear end surface (26) located on an opposing side of the face grooving portion (12) to the front end surface (24) and connecting the concave inner surface (16), the convex outer surface (18), the top surface (22) and the bottom surface (20); and
 a first insert seat (28) formed at an intersection of the front end surface (24) and the top surface (22), and in turn comprising an upwardly facing first insert seat bottom surface (42) and a second insert seat surface (44) spaced apart therefrom;
an upward direction (DU) defined as being normal to an imaginary insert seat plane (P3) of the first insert seat (28), at the first insert seat bottom surface (42) and a downward direction (DD) defined opposite to the upward direction (DU), the upward direction (DU) being perpendicular to the forward-to-rearward direction (DF, DR);
an outward direction (DO) defined as being in a direction perpendicular to the upward and downward directions (DU, DD) and also from in the concave inner surface (16) towards the convex outer surface (18);
an inward direction (DI) defined as being opposite the outward direction (DO); and
the forward direction (DF) defined from the rear end surface (26) to the front end surface (24), and the rearward direction (DR) defined opposite to the forward direction (DF); and
the clamping portion (14) extends from the face grooving portion (12) in the outward direction (DO), and is recessed in the rearward direction from the face grooving portion's front end surface (24), the clamping portion (14) comprising:
a top wedge surface (52);
a bottom wedge surface (54) located on an opposing side of the clamping portion (14) to the top wedge surface (52);
a blade abutment surface (56) located between the top wedge surface (52) and the bottom wedge surface (54); and
a rear stopper abutment surface (57) located between the bottom wedge surface (54) and the top wedge surface (52), and facing in the rearward direction (DR);
wherein:
the bottom wedge surface (54) is located in the downward direction (DD) and the inward direction (DI) relative to the top wedge surface (52); and
the face grooving holder comprising:
a shank portion (104) connected to a blade holder clamping portion (106);
the blade holder clamping portion (106) comprising:
 a clamping longitudinal axis (C1) establishing a clamping forward-to-rearward direction (CF, CR);
 a clamping vertical axis (C2) perpendicular to the clamping longitudinal axis (C1) and establishing a clamping upward-to-downward direction (CU, CD);
 a clamping lateral axis (C3) perpendicular to both the clamping longitudinal axis (C1) and the clamping vertical axis (C2), and establishing a clamping-first-side-to-clamping-second-side direction (CS1, CS2);
 a clamping front end (130) and a clamping rear end (132) spaced apart from one another along the clamping longitudinal axis (C1);
 a clamping top side (122) and a clamping bottom side (124) spaced apart from one another along the clamping vertical axis (C2);
 a first clamping side (126) and a second clamping side (128) spaced apart from one another along the clamping lateral axis (C3), the first clamping side (126) connecting the clamping top side (122) and the clamping bottom side (124); and
 a blade clamping seat (108) formed along the second clamping side (128) and opening out to the clamping front end (130);
the blade clamping seat (108) comprising:
 a flexibility groove (136) opening out to both the second clamping side (128) and the clamping front end (130);
 a top clamping wedge surface (138) located upward of the flexibility groove (136);
 a holder abutment surface (140) located downward of the top clamping wedge surface (138);
 a bottom clamping wedge surface (144) located downward of the flexibility groove (136) on an opposing side of the holder abutment surface (140) from the top clamping wedge surface (138); and
 a forwardly facing back stopper surface (146), located between the top clamping wedge surface (138) and the bottom clamping wedge surface (144) along the clamping vertical axis (C2), and rearward of the holder abutment surface (140) along the clamping longitudinal axis (C1);
wherein the top clamping wedge surface (138) extends in a direction along the clamping longitudinal axis (C1) farther than in directions along both the clamping vertical axis (C2) and the clamping lateral axis (C3);
wherein the bottom clamping wedge surface (144) extends in said direction along the clamping longitudinal axis (C1) farther than in directions along both the clamping vertical axis (C2) and the clamping lateral axis (C3); and wherein in a front end view of the face grooving holder (102):

the bottom clamping wedge surface (144) is located downward of the top clamping wedge surface (138) along the clamping vertical axis (C2), and farther than the top clamping wedge surface (138) in the second side direction (CS2) along the clamping lateral axis (C3); and the top clamping wedge surface (138) and the bottom clamping wedge surface (144) converge in a direction away from the holder abutment surface (140).

9. The face grooving tool (100) according to claim 8, wherein:

the blade's top wedge surface (52) abuts the holder's top clamping wedge surface (138);

the blade's bottom wedge surface (54) abuts the holder's bottom clamping wedge surface (144);

the blade's blade abutment surface (56) abuts the holder's holder abutment surface (140); and the blade's rear stopper abutment surface (57) abuts and the holder's back stopper surface (146).

10. The face grooving tool (100) according to claim 9, wherein:

the holder's blade clamping seat (108) has a seat area AS; and a surface contact area PA between the blade abutment surface (56) and the seat area AS fulfills the condition: PA>0.30AS.

11. The face grooving tool (100) according to claim 10, wherein the surface contact area PA fulfills the condition: PA>0.55AS.

12. The face grooving tool (100) according to claim 11, wherein the surface contact area PA fulfills the condition: PA>0.70AS.

* * * * *